Aug. 3, 1926. 1,594,382
J. W. ROCK
PROCESS OF TREATING RUBBER AND THE PRODUCT THEREOF
Filed May 28, 1923

Inventor
JACOB W. ROCK.
Attorney

Patented Aug. 3, 1926.

1,594,382

UNITED STATES PATENT OFFICE.

JACOB W. ROCK, OF AKRON, OHIO, ASSIGNOR TO THE AMERICAN RUBBER AND TIRE COMPANY, OF AKRON, OHIO, A CORPORATION OF OHIO.

PROCESS OF TREATING RUBBER AND THE PRODUCT THEREOF.

Application filed May 28, 1923. Serial No. 641,899.

This invention relates to a process for the preparation of rubber and particularly rubber sheeting to produce thereon a new and distinctive surface which is attractive to the eye and is useful for many purposes. The rubber sheeting so prepared is adapted for use in many ways, being particularly suitable for rubber bathing slippers, although it is capable of being put to other uses as will be apparent.

The surface which is obtained by the process and which it is the intention to cover herein is roughened or rugged in a peculiar fashion, having a surface resembling stucco, or it may be termed "stippled." The surface has also been termed as a "creped" surface owing to its resemblance, when viewed at a little distance, to crepe. It is a peculiar surface and is obtained in the new and novel process particularly described herein.

As a first step in the process, a sheet of rubber 1, which may have been prepared in the mill or calender in the usual manner, is passed between a pair of chilled rollers 2 under pressure. These rollers are polished and smooth and are chilled by any suitable means, preferably by circulating water therethrough at usual hydrant temperature. The actual temperature is not important, it being desired to maintain the rolls somewhat below ordinary room temperature and to counteract any tendency to heat up through the friction of the rubber on the rolls.

Figure 1:
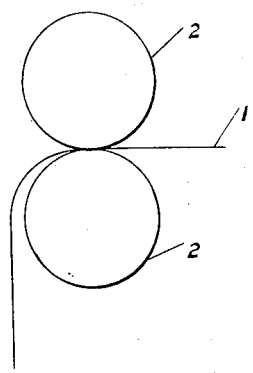
Figure 1 is a diagrammatic view showing the first step in the process.
Figure 2:
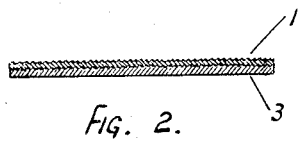
Figure 2 is a cross-section of the material showing also a second step which may be used if desired.
Figure 3:
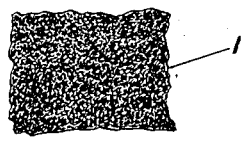
Figure 3 is a view of a fragment of the rubber showing the character of the surface obtained.

By passing the rubber sheet several times through the rollers, the surface is raised into a plurality of sharp, uneven elevations and depressions, so that it presents a knurled or creped appearance. The roughened surface thus obtained is broken up by a multitude of small, sharply defined and indiscriminately disposed gnarls which give it an attractive appearance not unlike a stuccoed surface which has been attempted to be shown in Figures 2 and 3 of the drawings.

In order to make the rubber more suitable for use in the manufacture of bathing shoes, it may be applied to a sheet of smooth surface rubber 3, to which it is attached by rolling. The rolling process eliminates the sharpness of the surface to some extent and improves it slightly without destroying the ruggedness of the sheet.

After the sheet has been prepared, it is utilized in the construction of the desired articles, which are cured in open heat or by an acid cure so as not to destroy the surface, and to maintain the decorative appearance in the vulcanized sheet.

In the use of my invention it may be possible to vary the process somewhat and still obtain the desirable results which have been described, and such modifications do not depart from the invention as stated and claimed herein and intended to be covered.

What I claim is:

1. A process of preparing rubber comprising passing a previously formed smooth sheet of rubber through chilled rolls whereby the surface of the rubber sheet is roughened and a knurled or creped surface obtained thereon.

2. A process of preparing rubber comprising passing a previously formed smooth sheet of rubber through rolls maintained in a chilled condition until the surface thereof is roughened and a knurled or creped surface is obtained thereon.

3. The process of preparing vulcanized rubber having a roughened surface thereon comprising passing a smoothly calendered sheet of rubber through chilled rollers, and subsequently vulcanizing the rubber without destroying the roughened surface formed thereon by the rollers.

4. The process of preparing rubber for use in the manufacture of footwear or the like comprising passing previously sheeted rubber having a smooth surface through chilled smooth surfaced rollers until the surface of the rubber is given a knurled or creped appearance.

5. The process of preparing rubber comprising passing previously sheeted rubber having a smooth surface through chilled rollers until the surface of the rubber is given a knurled or creped appearance, and then rolling the surface of the rubber to level it without destroying the roughened surface.

6. The process of preparing rubber comprising passing the rubber in smooth surfaced sheet form through chilled rollers until the surface is given a knurled or creped appearance, and attaching the sheet so formed to a second sheet of rubber having a smooth outer surface.

7. The process of preparing rubber comprising passing the rubber in smooth surfaced sheet form through chilled rollers under pressure until the surfaces thereof are given a knurled or creped appearance and subsequently rolling said sheet onto a second sheet of rubber having a smooth outer surface.

8. The process of preparing rubber comprising forming it into a sheet of uniform thickness and with a smooth surface, and subjecting the surface thereof to the action of a chilled roller whereby the surface is roughened and a knurled or creped appearance is imparted thereto.

9. The process of preparing rubber comprising forming it into a sheet of uniform thickness and with a smooth surface, and subjecting the surface thereof to the action of a pressure roller maintained in chilled condition whereby a roughened surface is formed thereon.

10. The process of preparing rubber comprising forming it into a sheet of uniform thickness and with a smooth surface, and subjecting the surface thereof to the action of a pressure roller maintained in chilled condition whereby a roughened surface is formed thereon, and subsequently rolling the roughened surface thereof to level it slightly without destroying the appearance thereof.

11. A sheet of vulcanized rubber of substantially even thickness throughout, preshaped with a smooth surface and having the surface broken into a multitude of small indiscriminately arranged elevations and depressions to resemble crepe.

12. A sheet of vulcanized rubber comprising two layers secured together, one of said layers being of substantially even thickness throughout, preshaped with a smooth surface and having the surface broken into a multitude of small indiscriminately arranged elevations and depressions to resemble crepe and the other layer having a smooth outer surface.

JACOB W. ROCK.